United States Patent [19]
Kigel

[11] Patent Number: 5,158,686
[45] Date of Patent: Oct. 27, 1992

[54] IMPURITY REMOVAL PROCESS AND APPARATUS

[75] Inventor: Mark Y. Kigel, East Brunswick, N.J.

[73] Assignee: Envar Services, Inc., Cranford, N.J.

[21] Appl. No.: 661,339

[22] Filed: Feb. 25, 1991

[51] Int. Cl.$^5$ .......................... C02F 1/52; C02F 1/62; C02F 1/72
[52] U.S. Cl. .................... 210/713; 210/721; 210/726; 210/738; 210/803; 210/805; 210/197; 210/912
[58] Field of Search ............... 210/721, 712, 713, 738, 210/803, 805, 195.3, 197, 198.1, 205, 207, 220, 221.1, 221.2, 912-914

[56] References Cited

U.S. PATENT DOCUMENTS

| | | | |
|---|---|---|---|
| 3,473,665 | 10/1969 | Duff | 210/207 |
| 3,725,266 | 4/1973 | Haviland | 210/912 |
| 3,800,024 | 3/1974 | Forsell et al. | 210/912 |
| 3,926,754 | 12/1975 | Lee | 204/152 |
| 3,929,640 | 12/1975 | Dohnert | 210/207 |
| 4,005,009 | 1/1977 | Kinoshita et al. | 210/912 |
| 4,036,726 | 7/1977 | Gale et al. | 204/231 |
| 4,098,690 | 7/1978 | Semmens | 210/18 |
| 4,123,339 | 10/1978 | Gale et al. | 204/149 |
| 4,145,282 | 3/1979 | Bruckenstein | 210/46 |
| 4,250,033 | 2/1981 | Hickey et al. | 210/106 |
| 4,253,947 | 3/1981 | Fan et al. | 210/610 |
| 4,322,296 | 3/1982 | Fan et al. | 210/610 |
| 4,326,963 | 4/1982 | Watson, Sr. et al. | 210/792 |
| 4,438,000 | 3/1984 | Fan et al. | 210/786 |
| 4,465,598 | 8/1984 | Darlington et al. | 210/912 |
| 4,547,286 | 10/1985 | Hsiung | 210/738 |
| 4,565,633 | 1/1986 | Mayenkar | 210/688 |
| 4,578,195 | 3/1986 | Moore et al. | 210/679 |
| 4,603,000 | 7/1986 | Casey | 210/207 |
| 4,612,115 | 9/1986 | Titoff | 210/189 |
| 4,707,252 | 11/1987 | Durot et al. | 210/151 |
| 4,743,376 | 5/1988 | Elmaleh et al. | 210/617 |
| 4,746,442 | 5/1988 | Calemma et al. | 210/725 |
| 4,764,284 | 8/1988 | Jansen | 210/715 |
| 5,035,795 | 7/1991 | Schmid | 210/207 |

FOREIGN PATENT DOCUMENTS

| | | |
|---|---|---|
| 268286 | 4/1970 | U.S.S.R. |
| 387935 | 6/1973 | U.S.S.R. |
| 604287 | 12/1977 | U.S.S.R. |
| 611399 | 2/1978 | U.S.S.R. |
| 714770 | 10/1979 | U.S.S.R. |
| 718374 | 2/1980 | U.S.S.R. |

Primary Examiner—Stanley S. Silverman
Assistant Examiner—Neil M. McCarthy
Attorney, Agent, or Firm—Darby & Darby

[57] ABSTRACT

A process and associated apparatus for removing contaminants such as heavy metals from contaminated water, waste water, sludge or flushed soil elutriates, or leachates. The remediation method utilizes a combination of chemical oxidation/reduction reactions and physical separation techniques employing a pseudofluidized bed and is carried out in a unitary reactor comprising zones for activation, flocculation and phase separation.

4 Claims, 4 Drawing Sheets

IMPURITY REMOVAL PROCESS AND APPARATUS

FIELD OF THE INVENTION

This invention relates to methods for removal of contaminants from surface water and soil. More particularly, the invention is directed to a method and apparatus for remediating contaminated water supplies by removal of impurities such as heavy metals. The invention is equally effective in removing such impurities from waste water, semi-fluid sludge and/or soil elutriates, and leachates of contaminated soils.

BACKGROUND OF THE INVENTION

Contamination of water supplies by heavy metals is a serious problem posing dangerous health hazards. Physical processes for heavy metals removal from solution are known in the art and include ion exchange methods using resins specific for individual heavy metals, and membrane filtration processes such as reverse osmosis and ultrafiltration using membranes selective for specific ions.

For instance, U.S. Pat. No. 4,578,195 describes a method using chelating ion-exchange resins. Methods of this and the spent brine, itself, becomes a waste problem.

Membrane filtration methods require high initial set-up costs due to the complexity of the apparatus involved. Furthermore, operating costs in terms of high wage manpower to monitor the relatively more sophisticated technology, and replacement costs for maintaining components needed for constant membrane cleaning and water pretreatment make this alternative an uninviting one.

Physical filtration techniques using steady-state or semifluidized filtration beds are also known. U.S. Pat. No. 4,438,000 discloses a filtration process using a semifluidized bed of particles immobilized by a porous retainer for the filter medium.

Methods based on fluidized bed filtration are also known for biological waste water treatment. For example, Soviet Pat. No. 604,287 discloses a column-type aeration tank for purification of sewage with biological activated sludge, and Soviet Pat. No. 714,770 describes a waste water purification method using bio-activated sludge which is subsequently phase separated in a bioreactor.

Conventional chemical processes for precipitating heavy metals from solution include chemical oxidation at approximately neutral pH to convert soluble metal oxides into insoluble hydroxides, such as disclosed in U.S. Pat. No. 4,565,633. U.S. Pat. No. 4,764,284 describes a process of high pH alkaline precipitation of heavy metals as insoluble hydroxides in a reactor containing a fluidized bed of suitable bed material.

The problem with these methods is the difficulty of incorporating the general chemical concepts into workable, efficient and feasible chemical engineering systems. The current state of the art necessarily require multiple facilit-ies for activation, treatment and separation of heavy metals. Because multiple units are required, large areas are necessary, along with a relatively high manpower requirements for monitor-ing the separate systems. Additionally, the conventional systems require automation and control sub-systems which add to the complexity and cost of existing methods. All of these drawbacks have forced the industry to rely on electrochemical processes which are, currently, the only practical solution to large scale heavy metals removal.

Electrochemical methods for removal of high valency iron from solution are disclosed in U.S. Patent Nos. 3,926,754, 4,036,726, and U.S. Pat. No. 4,123,339. In these methods, insoluble iron matrices are generated with electrolysis using a suitable anode. Unfortunately start-up and operational costs for such electrolytic methods and operating costs are high.

OBJECTS OF THE INVENTION

One object of the present invention is to provide a compact system which combines chemical processes, for the ionic neutralization of dangerous chemical contaminants, with physical processes for isolating and separating precipitated impurities.

Another object of the present invention is to provide technically and economically efficient method for selective removal of pollutants such as heavy metals from contaminated water, sludge and soil elutriates, and leachates.

Another object of the present invention is to provide an industrially feasible technology for the removal of various heavy metals from liquids using a single reactor capable of combining all treatment processes in one unit.

A further object of the present invention is to provide a compact and versatile waste-removal apparatus suitable for both large or small scale clean-up of contaminated water, sludge and/or soil elutriates, and leachates.

A still further object of the present invention is to provide a unit reactor which can be coupled either vertically or horizontally to provide multiple units in series or parallel or both.

These and other objects will become apparent to those skilled in the art in light of the following disclosure.

SUMMARY OF THE INVENTION

The present invention addresses the need for a practical cost-effective method and associated apparatus for removing dangerous heavy metals such as lead, tin, cadmium, silver, palladium, mercury, molybdenum, zinc, copper, nickel, iron, chromium, vanadium, aluminum, arsenic, antimony, barium, or combinations thereof, effectively from raw water, sludges and contaminated soils.

The term "raw water" as used herein refers to still or flowing contaminated water, including ground water, sewer water, waste water, sludge and soil elutriates, and leachates. "Elutriates and leachates" refer to fluids obtained by flushing contaminated soils with water of relatively high purity. These fluids may also be used as an intermediate fluid medium for cleaning contaminated soil.

The process of the present invention is carried out in a unitary system wherein both unit processes and unit operations take place. Initially, the raw water is admixed with a suitable activating or oxidizing agent in an activation zone located at an intermediate point in the system. Thereafter, the activated water is distributed into a flocculating zone at the upper end of the system and contacted with a flocculating agent so as to initiate the precipitation of the metallic components, thereby forming a two-phase solid-liquid medium. This admixture takes place in an area of high turbulence to facilitate the reaction of the flocculating agent with the activated water.

A portion of the turbulent solid-liquid phase descends downwardly from the flocculation zone under the force of gravity and comes into contact with upwardly moving circulating fluid rising from the bottom of the system so as to form a substantially stationary pseudofluidized bed. i.e., a suspension of the solid particles in the water. Because of the differing densities, a portion of the solids-rich material (the "solids phase") descends, while a portion of the solids-lean material (the "clarified material") rises from the pseudo-fluidized bed so as to initiate the separation of the two phases.

The clarified material, rises through a zone of decreasing cross-section which culminate in an effluent conduit from which the clarified material exits the reactor. During its upward flow, the stream is further depleted of solid material so that the material withdrawn is of a relatively high purity. Analogously, since the solids in the media tend to fall relative to the lighter liquid, a higher concentration of sludge ultimately forms at the bottom where it is removed from the system.

At the lower end of the system, a circulating fluid is bubbled upwardly through the descending solids and sweeps therewith preferentially the liquid portion of the relatively low solids medium therein. A portion of this liquid, aided by the circulating gas, is carried to the upper portion of the unitary system and brought into the turbulent region in the flocculation zone. This circulation increases the residence time of the solid material in the reactor to provide the necessary time for mixing, precipitation, flocculation and phase separation.

The sludge is accumulated and periodically removed from the lower portion of the system. It may be neutralized to a pH of 7 and thickened so as to form an inert final product for disposal or reuse.

The aforesaid process permits a highly efficient separation of solid metal contaminants from the raw water input stream. The unitary nature of the system results in simplicity and economy of operation.

The apparatus of the present invention may be conveniently referred to herein as "a reactor," though both unit operations and unit processes take place therein. The reactor is basically a hollow sealed enclosure having intermediate therein at least one slanted baffle; an activation chamber disposed below said baffle; conduit means for passing the activated raw water to a liquid diffuser, said liquid diffuser means being located above said baffle in a flocculation zone. The lower end of the reactor is adapted to receive sludge formed in the process and exit means are provided therein for removing the sludge from the reactor. Similarly, inlet means are provided for introducing the flocculating agent, and a gas diffuser is provided in the lower end of the reactor to provide in part the fluid circulation required by the system.

DETAILED DESCRIPTION OF THE INVENTION

Figure 1:
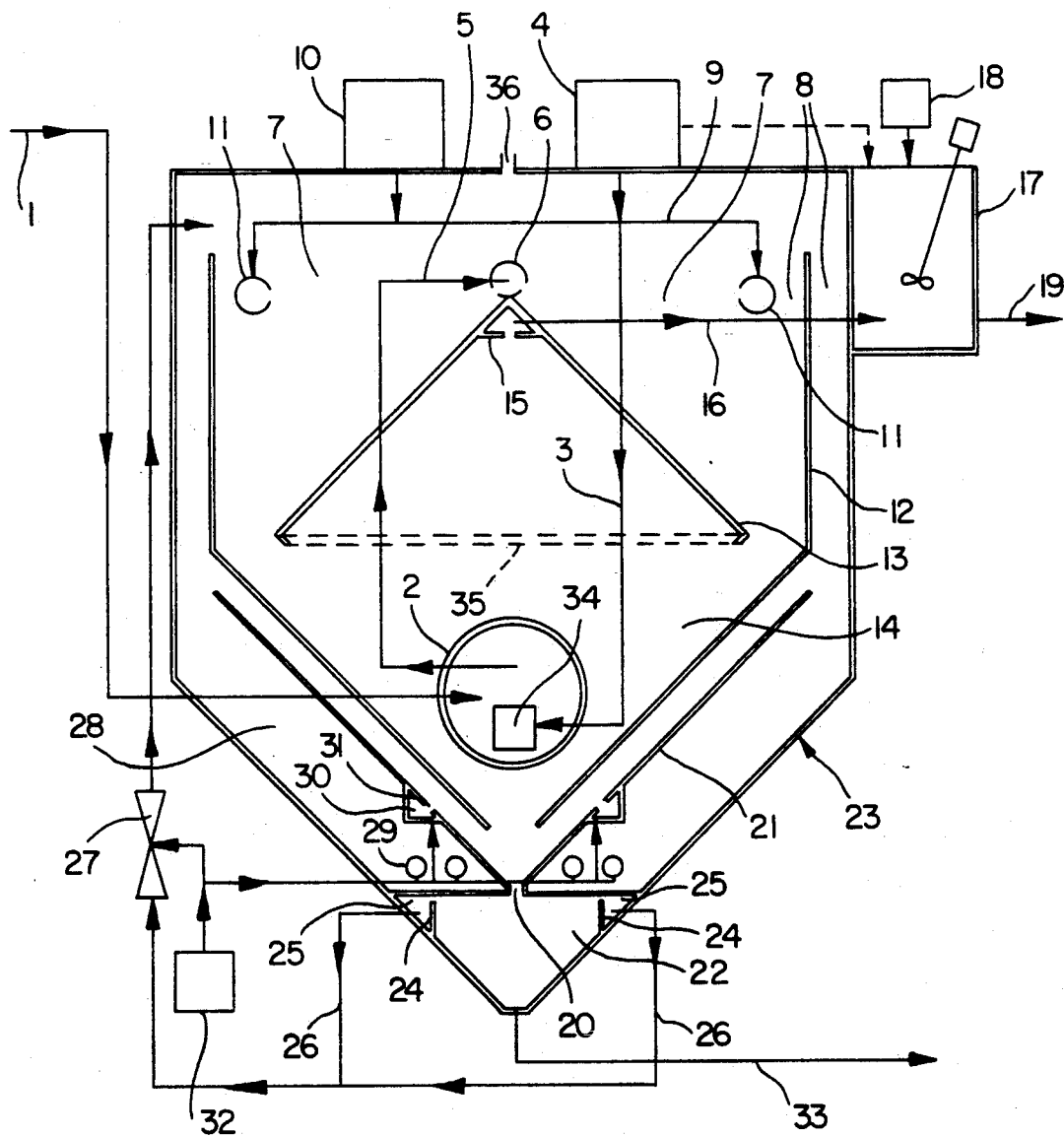
FIG. 1 is a schematic depiction of the reactor apparatus of the present invention.
Figure 2:
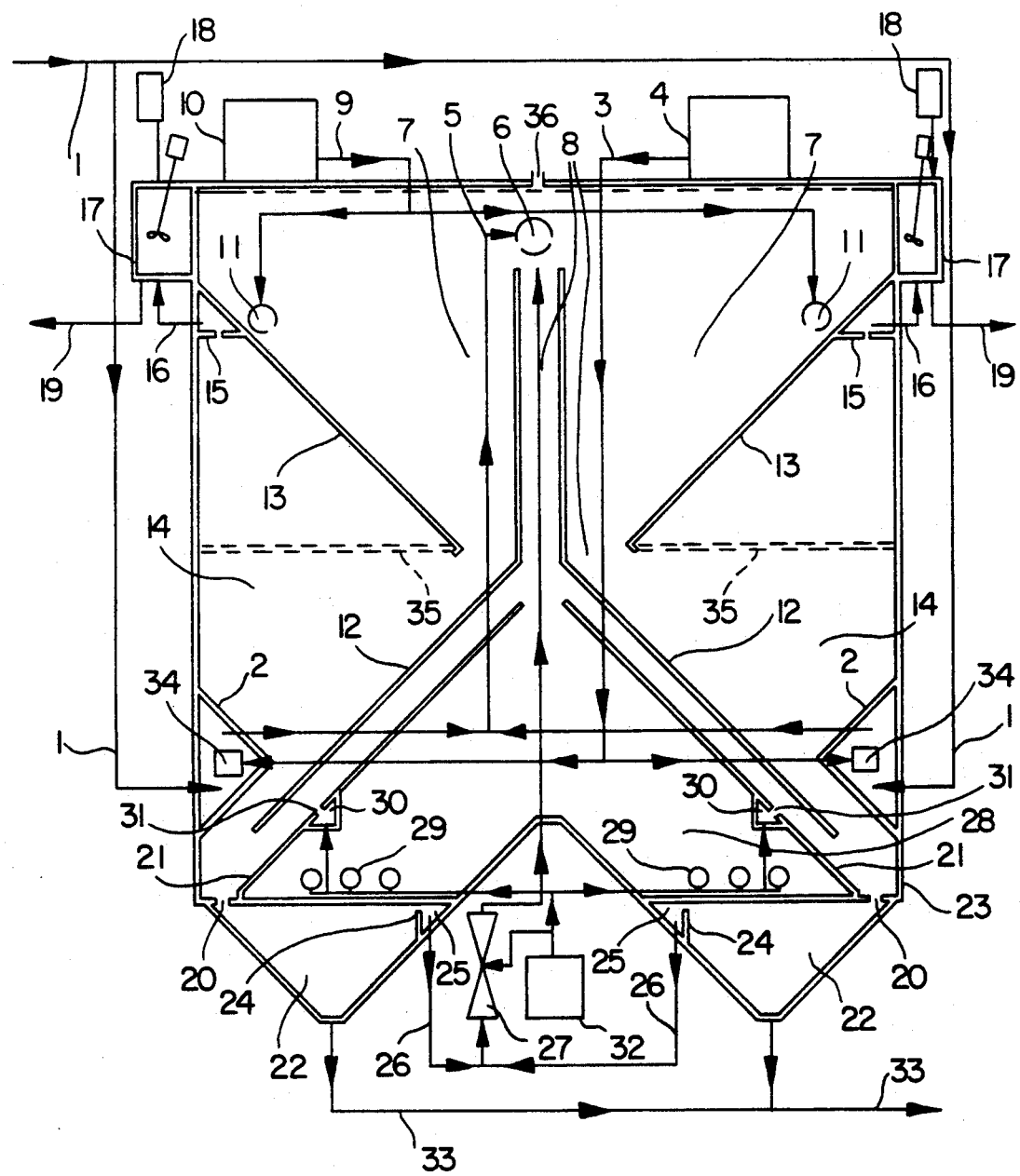
FIG. 2 shows schematics for another version of the reactor.

Referring to FIGS. 1 and 2, raw water enters reactor 23 via inlet pipe 1 into an activation chamber 2 where it is activated (either acidified or oxidized) with a suitable acidifying or oxidizing agent introduced through inlet line 3 which is connected to an agent reservoir 4. A mixing means 34 is installed in activation chamber 2 and can be a mechanical mixer, jet nozzles, or a porous gas diffuser.

Activated raw water is conveyed out of activation chamber 2 through outlet line 5 into internal cylinder 12 via perforated tube 6. Activated water fills internal cylinder 12 and the remaining spaces inside reactor 23. Between buffer 21 and the walls of reactor 23 is formed an aeration zone 28 into which air diffuser nozzles 29 pump bubbled air into the reactor, beginning a recirculation flow 8. Air is supplied by blower unit 32. Reactor 23 has an exhaust 36 for bleeding off excess air pressure.

As liquid flows around the upper edge of internal cylinder 12, it encounters slanted baffle 13, and forms a zone of high turbulence 7. Into this turbulent zone periodically is introduced a flocculation reagent, such as a lime slurry, via inlet means 9, which connects reagent reservoir 10 to distribution tube 11, and the resulting mixture is allowed to agitate. Flocculation begins in highly turbulent area 7. The reactor is vented to the atmosphere via exhaust line 36.

Below the turbulent zone 7, a portion of the liquid moves around the edges of baffle 13 into the fluid vortex region 14. The suspension flows into the area enclosed by the baffle 13 and forms a pseudofluidized bed region. This region provides additional reaction time and space for further coagulation and simultaneous phase separation of the effluent from the semi-solid slurry. The clarified effluent is conveyed through a zone of decreasing cross-section through perforated tube 15 to an effluent chamber 17 where it is neutralized with a suitable agent from supply unit 18 or with the activation agent from unit 4, if appropriate. Clean water is discharged from chamber 17 through line 19.

An essential feature of the invention is the circulation of the fluids in the reactor to permit the necessary reaction and phase separation to take place in the compact volume of the unitary reactor. In practice for each volume of effluent withdrawn from the reactor, at least ten, preferably, fifteen volumes are recirculated. The air bubbling up from the air diffusers 29 carries upwardly the fluid in aeration zone 28. A portion of the air is passed via the air supply tube 30 through the opening 31 and draws upwardly a portion of the slurry descending from the fluid vortex zone 14 and the bottom of the internal cylinder 12. By controlling the air flow through line 30 the pseudofluidized bed is properly maintained. The aerated streams recirculate into the turbulent zone 7 via the zones 8.

The extent of fluid circulation may be visualized best by noting that the volume of fluids recirculated downwardly between the exterior to the baffle 13 and the internal cylinder is preferably fifteen times greater than the flow of effluent exiting the reactor via line 16. The bulk of this recirculated fluid is, as noted above, withdrawn from the bottom of the internal cylinder, aerated and returned to the turbulent zone 7 at the upper end of the reactor.

To further enhance the separation of effluent and slurry, an additional semi-pseudofluidized bed can be created by installing a lamella cartridge 35 (shown with dotted lines in FIGS. 1 and 2). The addition of lamella cartridge 35 within the edges of baffle 13 provides an additional phase separation above the pseudofluidized bed.

Additional circulation is provided by withdrawing slurry collected in inner chamber 25, via lines 26 and pump 27.

When semi-solid sludge becomes sufficiently heavy it separates from the pseudofluidized bed. The heavy semi-solid sludge settles between the vertical partitions 24 at the bottom of the reactor and is periodically removed through outlet 2 into sludge thickening chamber 22. Inside the thickening chamber, partitions 24 form a mini chamber 25 from which sludge supernatant is collected. The sludge supernatant is then conveyed by line 26 back into turbulent zone 7 by an air lifting device 27. Thickened sludge is conveyed via sludge outlet 33 out of the reactor unit for appropriate disposal.

Figure 3:
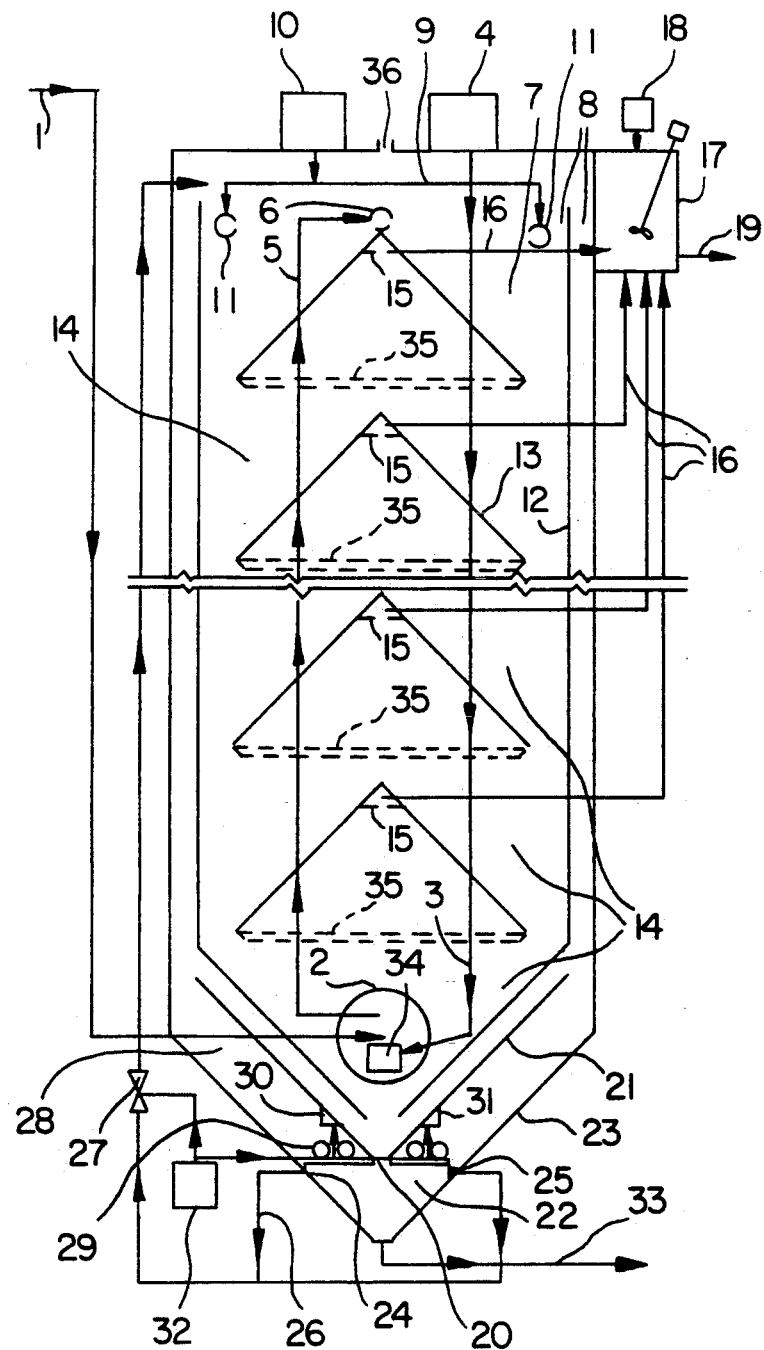
FIG. 3 depicts a modified reactor with multiple vertical baffles.
Figure 4:
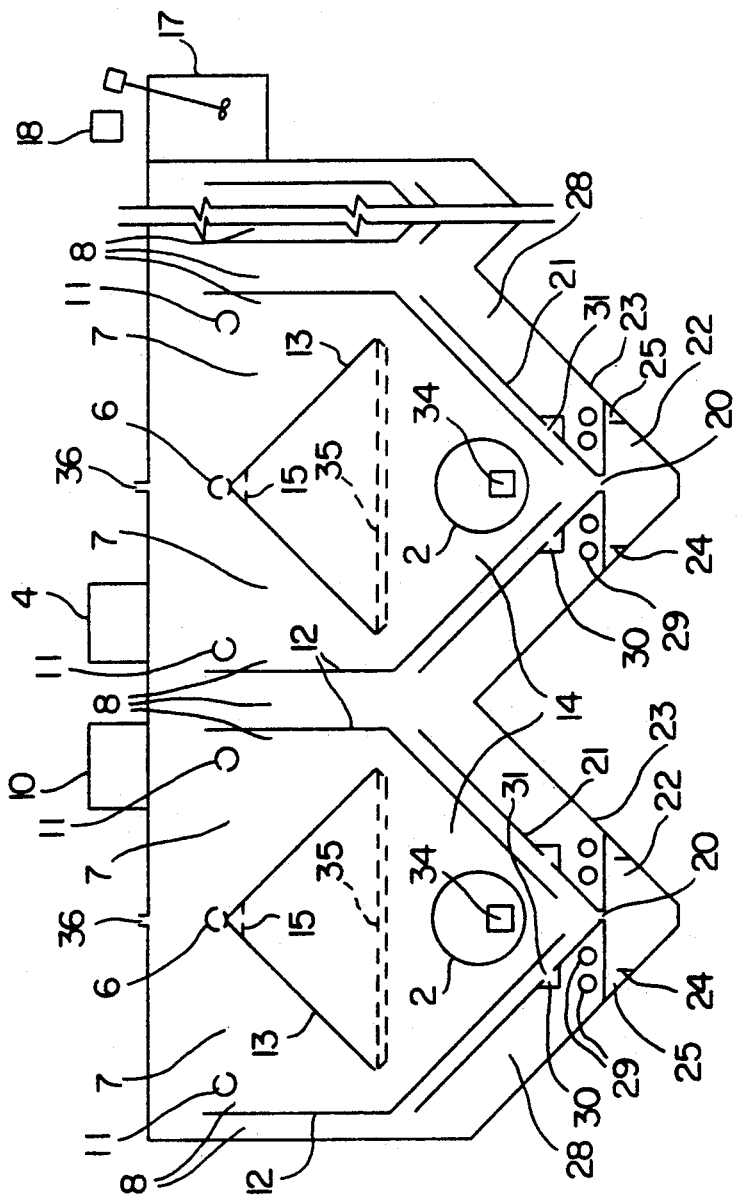
FIG. 4 depicts two or more reactor units coupled horizontally in series.

FIG. 3 depicts an embodiment of the reactor showing multiple baffles arranged vertically, one above the other. FIG. 4 shows two reactor units coupled horizontally. One skilled in the art can easily adapt the reactor units to other arrangements depending on the volume and nature of the clean up task.

The following are examples of the chemical steps involved in the chemical removal of heavy metals from contaminated water. Chromium is used as an example of the heavy metal contamination.

Example I—Lab Scale Testing

To demonstrate the feasibility of the invention, two lab scale runs were performed, one with low and the second with a high concentration of chromium. In the first run, the contaminated water having a distinct yellow color, evidencing the presence of hexavalent chromium, was fed to a mixing unit. The raw water had a pH of 6.5 and a hexavalent chromium concentration of 19 ppm. To the mixing unit, sulfur dioxide (as the activating agent) from a gas cylinder was bubbled through the contaminated water until the solution turned a pale green color, evidencing the formation of trivalent chromium. The solution then had a pH of 2. Each liter of water was treated with approximately 27.4 liters of sulfur dioxide.

Using a 10% calcium hydroxide lime slurry, 1000 mg per liter were added gradually in 1 to 10 ml portions to the activated water and mixed so as to initiate the flocculation. Sufficient lime was added until the pH was 12.5. By maintaining proper hydraulic conditions, a pseudofluidized bed was formed in the reaction zone from which the sludge precipitated and separated from the alkalified effluent. Clean liquid was withdrawn from the top of the bed and neutralized to a pH of 7 by the addition of sulfuric acid. No sludge or sediment formed during the course of the neutralization reaction. Table 1 shows the results of the first run:

TABLE 1

Results of First Test Run of Chromium Removal from Water

| Sample Points | pH | Chromium Concentrations, ppm | | |
|---|---|---|---|---|
| | | Hexavalent | Trivalent | Total |
| Raw water | 6.50 | 19.00 | 0.00 | 19 |
| Acidified water | 1.94 | <0.01 | 18.99 | 19 |
| Alkalified water | 12.54 | <0.01 | 0.11 | 0.12 |

In the second run, the ground water sample had a higher concentration of total chromium, namely, 5.20 ppm of hexavalent chromium and 6,495 ppm trivalent chromium for a total chromium of 6,500 ppm, and a pH of 7.62. The hexavalent chromium in the raw ground water was reduced to the trivalent state at a sulfur dioxide-to-water ratio of 27:1 under normal conditions and a residence time not greater than 10 min. The acidified ground water had a pH of 5.85. Precipitation of chromium hydroxide from the trivalent chromium was initiated at a pH of 9.63 dosage for effective flocculation was 50 ppm. The minimum time required for the flocculation-coagulation-precipitation was 1 hr. The trivalent chromium concentration of the clarified alkalified effluent was 380 ppm. No hexavalent chromium could be detected.

After neutralization to a pH of 9.30 and settling, the final chromium concentration of the purified water was 96 ppm trivalent chromium.

Table 2 shows the results of the second run:

TABLE 2

Results of Second Test Run of Chromium Removal from Water

| Sample Points | pH | Chromium Concentrations, ppm | | |
|---|---|---|---|---|
| | | Hexavalent | Trivalent | Total |
| Raw groundwater | 7.62 | 5.20 | 6,495 | 6,500 |
| Acidified water | 5.85 | ND | 6,500 | 6,500 |
| Alkalified effluent | 12.00 | ND | 380 | 380 |
| Neutralized water | 9.30 | ND | 96 | 96 |

It was calculated that for each square foot of fluidized bed surface area, 0.374 gal./min. of liquid can be processed. Should lower concentrations of metals be mandated, the neutralized water can be fed to a second purification unit, for example another unit as described herein, for achieving even greater purity.

Example II

To demonstrate the process and apparatus of the invention, a 5000 gal. reactor having the configuration shown in Example 1 and a pseudofluidized bed area of 54 ft$^2$ and a 2 ft. diameter activation chamber having a volume of about 210 gal is used. Twenty gal. per min. of contaminated ground water having a hexavalent chromium concentration of 1500 ppb is fed to the activation zone of the reactor wherein it is mixed with 125 gal./min. (16.7 cfm) of sulfur dioxide. This represents a volumetric ratio of 27:1 of sulfur dioxide (STP) to feed water. To maintain the circulation in the reactor, the air flow rate into the bottom thereof is 300 gal./min. (40.0 cfm). The ground water and the sulfur dioxide are maintained in the activation chamber for about 11 min. and the reaction product passed to the flocculation/coagulation zone. In this zone, the activated water is contacted with about 5.75 gal./day of lime slurry entering the top of the reactor from the lime storage zone. The volume of the lime contacting zone, i.e., the volume for mixing, flocculation, coagulation and alkali fixation, is about 1440 gal. The lime mass added to the reactor is 4.8 lbs./day. It is added intermittently as a 10% aqueous solution at a rate sufficient to maintain a pH of about 12 in the mixing zone. The total flocculation/coagulation detention time is 1.2 hr.

The treated ground water is removed from the reactor having a concentration of less than 10 ppb of chromium, that is, the chromium is essentially non-detectable. From the bottom of the reactor is removed, periodically as it accumulates, a total of 32 gal./day of a residual dewatered sludge containing about 75% moisture.

The electrical energy consumed to power the reactor is approximately 3.7 kWh or 0.0245 cents/gal. The production cost for the reactor used above, including costs for on-site hookup, is approximately $90,000. The reactor is made of 304 stainless steel and is 11 feet high and 8 feet in diameter. The activation chamber is equipped with three Roeflex TM tube fine bubble diffusers which supplies sulfur dioxide from the activation agent reservoir, and with a Flyght Model 4351 submersible mixer Twelve Roeflex TM disk fine bubble air diffusers provide air for recirculating flow from a Becker Model KDT 2.60 rotary vane compressor. The neutralization chamber is equipped with a Lightnin Model XJ43 mixer.

Additional equipment includes a feed pump, pH control device, flow indicator, panel board, logic controller, lime supplying unit, air lift, sludge pump, filter press, piping and electrical wiring.

Calculated operational costs include costs for sulfur dioxide and lime, electrical energy, and labor for operation. The cost for the reagents was estimated stoichiometrically as follows: (a) for acidification - of 1.85 ppm of $SO_2$ per 1 ppm of $Cr^{6+}$; and (b) for coagulation - 2.38 ppm of calcium hydroxide per 1 ppm of $Cr^{3+}$. The cost of electrical energy was estimated at the price of 8 cents/(kWh). Labor cost was estimated at $15.00/hr. The total operational cost was calculated at about $3,000 a year, or 0.0285 cents/gal.

Based on information available from Andco Environmental Processes, Inc., Buffalo, N.Y. (the assignee of the electrochemical methods disclosed in U.S. Patent Nos. 3,926,754, 4,036,726, and 4,123,339), the calculated costs for an Andco electrolysis apparatus for groundwater remediation of the same 20 gpm facility would require comparative set-up costs of $171,000, and calculated operating costs for such an Andco facility is about $3,650 per year, or 0.0365 cents/gal.

Thus, the subject invention, for comparable capacity requires about a 50% less capital and about 22% less annual operational costs. The above cost comparison is further tabulated below where "+" means a facility is required in the plant, and "−" means that a facility is not required in the plant.

TABLE 3

| Comparison Of Equipment Requirements | | |
|---|---|---|
| Plant Facilities | Andco Process | Present Invention |
| Feed pump | + | + |
| Activation tank with mixer | + | + |
| pH control | + | + |
| Flow indicator | + | + |
| Panel board | + | + |
| Logic controller | + | + |
| Electrochemical reactor | + | − |
| Pseudofluidized bed reactor | − | + |
| Acid wash system | + | − |
| Polymer feed system | + | − |
| Clarification system | + | − |
| Sludge thickening system | + | − |
| Filter press | + | + |
| Sulfur dioxide supply | − | + |
| Acid supply | + | − |
| Electrode replacement | + | − |
| Polymer supply | + | − |
| Lime supply | − | + |
| Multimedia filtration system | + | − |

What is claimed is:

1. A process for removing heavy meal contaminants from liquids, comprising:
   a. mixing an aqueous liquid containing heavy metal contaminants with an oxidizing agent in a mixing zone;
   b. diverting the oxidized aqueous liquid into a zone of high turbulence;
   c. adding a flocculating agent to the oxidized aqueous liquid in the zone of high turbulence, so as to form a precipitate of metal contaminants;
   d. forming a pseudofluidized zone at least partially enveloping said mixing zone by flowing the aqueous liquid containing said precipitate downwardly from said zone of high turbulence and by flowing upwardly fluid from the bottom portion of a reactor;
   e. gradually separating the precipitate from the lower portion of said pseudofluidized zone;
   f. withdrawing upwardly from the upper portion of said pseudofluidized zone water of relatively high purity containing a substantially reduced concentration of said precipitate;
   g. withdrawing a slurry containing said precipitate and recirculating the bulk of said slurry to said zone of high turbulence; and
   h. withdrawing from said slurry a sludge containing higher concentration of said precipitate.

2. A process for removing heavy metal contaminants from liquids, comprising:
   a. mixing an aqueous liquid containing heavy metal contaminants with an oxidizing agent in a mixing zone;
   b. diverting the oxidized aqueous liquid into a zone of high turbulence upwardly disposed from said mixing zone;
   c. adding a flocculating agent to the oxidized aqueous liquid in the zone of high turbulence, so as to form a precipitate of metal contaminants;
   d. forming a pseudofluidized zone at least partially enveloping said mixing zone by flowing the aqueous liquid containing said precipitate vertically downward from said zone of high turbulence and by flowing vertically upward fluid from the bottom portion of a reactor;
   e. gradually separating the precipitate from the lower portion of said pseudofluidized zone;
   f. withdrawing upwardly from the upper portion of said pseudofluidized zone, at a point above said mixing zone, water of relatively high purity containing a substantially reduced concentration of said precipitate;
   g. withdrawing a slurry containing said precipitate from said lower portion of said pseudofluidized zone at a point beneath said mixing zone and recirculating the bulk of said slurry to said zone of high turbulence; and
   h. withdrawing from said slurry a sludge containing a higher concentration of said precipitate.

3. The process of claim 1 wherein the water of relatively high purity is withdrawn upwardly through a zone of decreasing cross-section situated above said pseudofluidized zone.

4. The process of claim 1 wherein the volume of the recirculated slurry is at least ten times the volume of the water of relatively high purity withdrawn from the process.

* * * * *